(12) United States Patent  
Steele

(10) Patent No.: US 9,367,700 B2  
(45) Date of Patent: Jun. 14, 2016

(54) SYSTEM AND METHOD FOR ESTABLISHING A SHARED SECRET FOR COMMUNICATION BETWEEN DIFFERENT SECURITY DOMAINS

(75) Inventor: Joseph D. Steele, Danville, CA (US)

(73) Assignee: Adobe Systems Incorporated, San Jose, CA (US)

(*) Notice: Subject to any disclaimer, the term of this patent is extended or adjusted under 35 U.S.C. 154(b) by 470 days.

(21) Appl. No.: 13/029,027

(22) Filed: Feb. 16, 2011

(65) Prior Publication Data

US 2013/0132736 A1    May 23, 2013

(51) Int. Cl.  
*H04L 29/06* (2006.01)  
*G06F 21/60* (2013.01)

(52) U.S. Cl.  
CPC ...... *G06F 21/606* (2013.01); *G06F 2221/2149* (2013.01)

(58) Field of Classification Search  
CPC .......... G06F 21/606; G06F 2221/2149; H04L 29/06  
USPC ..................................... 713/164, 163; 726/16  
See application file for complete search history.

(56) References Cited

U.S. PATENT DOCUMENTS

| | | | | |
|---|---|---|---|---|
| 2002/0129239 | A1* | 9/2002 | Clark | 713/153 |
| 2003/0101322 | A1* | 5/2003 | Gardner | 711/163 |
| 2011/0022846 | A1* | 1/2011 | Ginter et al. | 713/176 |
| 2011/0314271 | A1* | 12/2011 | Boccon-Gibod et al. | 713/151 |

* cited by examiner

*Primary Examiner* — Vivek Srivastava  
*Assistant Examiner* — Normin Abedin  
(74) *Attorney, Agent, or Firm* — Wolfe-SBMC

(57) ABSTRACT

Embodiments may include generating an initial verifier for a first process, the initial verifier generated based on a trusted image of the first process. Embodiments may include, subsequent to generating an untransformed secret associated with the first process, using a reversible transform to transform the untransformed secret with the initial verifier to generate a transformed secret associated with the first process. Embodiments may also include, subsequent to the first process being launched outside of a secure domain, and dependent upon a second verifier generated from a current state of the first process being the same as the initial verifier: using the reversible transform to reverse transform the transformed secret with the second verifier to generate a de-transformed secret equal to the untransformed secret. Embodiments may include performing a secure communication protected with a cryptographic key generated based on the de-transformed secret. The communication may be performed across different security domains.

33 Claims, 8 Drawing Sheets

SYSTEM AND METHOD FOR ESTABLISHING A SHARED SECRET FOR COMMUNICATION BETWEEN DIFFERENT SECURITY DOMAINS

BACKGROUND

This disclosure is directed to computer systems. More particularly, it is directed to the secure communications within a computing environment.

Elements within a computing environment (executable components, applications, processes, etc.) may communicate with each other through secure techniques, such as encryption. For instance, a first element may encrypt data before providing that data to a second element within the computing environment. In conventional systems, a shared secret (e.g., a symmetric encryption key) may be provided to both elements to enable encrypted communications between such elements. Within the context of the previous example, the first element may encrypt the data with its shared secret and provide the encrypted data to the second element. The second element may decrypt the data with its shared secret. In this way, other elements within the computing environment will not be able to determine the clear version of the data because such elements do not possess the shared secret. In some instances, these elements may operate within an environment that cannot ensure the secrecy of the shared secret. For instance, an attacker or malicious application may utilize a debugger to inspect an element to determine that element's shared secret. Mechanisms such as code obfuscation may prevent casual observers from deciphering the shared secret; secrecy of shared secrets when faced with a detailed inspection of an element may not be guaranteed. In some cases, once a shared secret has been comprised, any element that has access to the compromised secret may decipher the clear version of data or information protected with that secret.

SUMMARY

Embodiments may include generating an initial verifier for a first process, the initial verifier generated based on a trusted image of the first process. For example, a cryptographic hash function may be utilized to generate a digest of a given process. Embodiments may also include, subsequent to generating an untransformed secret associated with the first process, using a reversible transform (e.g., an exclusive-or operation) to transform the untransformed secret with the initial verifier to generate a transformed secret associated with the first process. Embodiments may also include, subsequent to the first process being launched outside of a secure domain, and dependent upon a second verifier generated from a current state of the first process being the same as the initial verifier (e.g., to ensure the first process has not been modified): using the reversible transform to reverse transform the transformed secret with the second verifier to generate a de-transformed secret equal to the untransformed secret. For instance, such protocol may be performed when the first process requests its secret for use in a secure communication (e.g., the secret may be used as an encryption key or an encryption key may be generated from the secret). Embodiments may include performing a secure communication between the first process outside of the secure domain and a secure process executing within the secure domain; the secure communication may be protected with a cryptographic key generated based on the de-transformed secret. The secure domain may have one or more safeguards in place to prevent unauthorized access to information or processes within the secure domain. For instance, the secure domain may prevent elements outside of the secure domain from altering the state of processes or other elements within the secure domain. Likewise, the secure domain may also include one or more data stores including information that is not accessible to elements outside of the secure domain. In various embodiments, the contents of the secure domain may not be susceptible to security attacks, such as debugging inspection or other malicious techniques.

Figure 1:
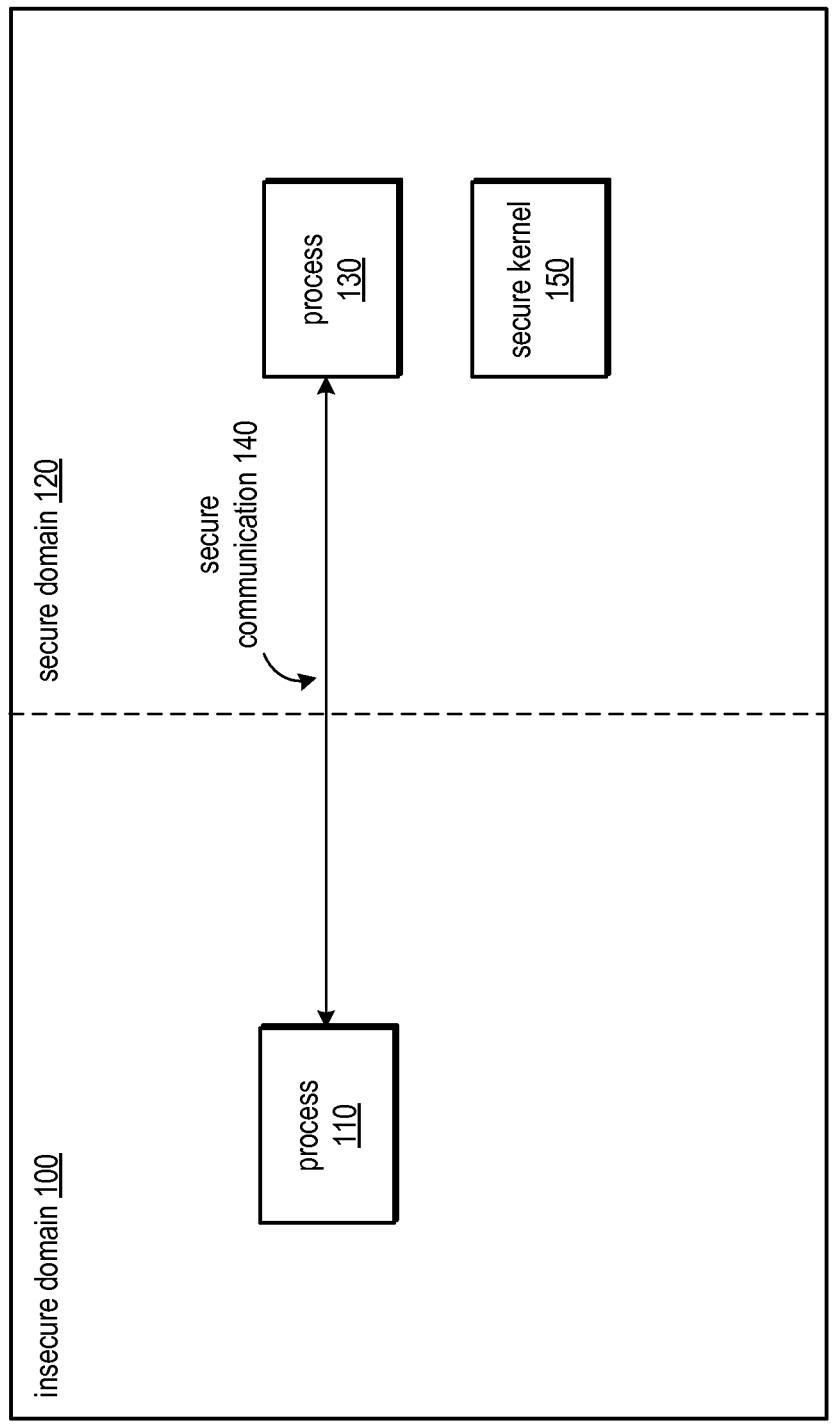
FIG. 1 illustrates a block diagram of an example system in which multiple secure communication may be performed, according to some embodiments.

While the system and method for establishing a shared secret for communication between different security domains is described herein by way of example for several embodiments and illustrative drawings, those skilled in the art will recognize that the system and method for establishing a shared secret for communication between different security domains is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for establishing a shared secret for communication between different security domains as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for establishing a shared secret for communication between different security domains are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Note that the description presented herein may include one or more references to a one-way function or a cryptographic hash function, either of which may be referred to herein as simply a hash function. Generally speaking, a hash function may operate on a block of data in order to return a fixed-size bit string (e.g., the hash value, or simply "hash") such that an accidental or intentional change to the block of data will result in a different hash value if the hash function is performed on that changed data (although variations thereof may be utilized in various embodiments). In some cases, the aforesaid block of data may be referred to as a "message" and the corresponding hash value may be referred to as the "message digest" or simply a "digest." In various embodiments, a hash function may include any function or set of operations operating as described above. Examples of hash functions include, but are not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions. In various embodiments, references to performing cryptographic hash functions may include generating a keyed-Hash Message Authentication Code (HMAC), such as HMAC-SHA1 or HMAC-MD5.

Various embodiments include encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate symmetric encryption keys for symmetric encryption.

FIG. 1 illustrates a block diagram of a computing environment in which embodiments may be implemented. In the illustrated embodiment, the insecure domain 100 and the secure domain 120 may reside on the same computer systems or on different computer systems. In some embodiments, executable content (e.g., process, applications, etc.) of the insecure domain and the secure domain may be implemented on different processors, either physical or virtual. The secure domain may have one or more safeguards in place to prevent unauthorized access to information or processes within the secure domain. For instance, the secure domain may prevent elements outside of the secure domain from altering the state of processes or other elements within the secure domain. Likewise, the secure domain may also include one or more data stores including information that is not accessible to elements outside of the secure domain. In various embodiments, the contents of the secure domain may not be susceptible to security attacks, such as debugging inspection or other malicious techniques. While in some cases, insecure domain 100 may include some security mechanisms, secure domain 120 generally maintains a higher level of security relative to the insecure domain.

Various embodiments may enable secure communication 140 between process 110 and process 130. In some embodiments, process 110 may be referred to as an insecure process by virtue of process 110 executing outside of the secure domain. However, it should be noted that this is a term of convenience and does not imply any specific deficiency with the process itself. Similarly, process 130 may be referred to herein as a secure process by virtue of process 130 executing within the secure domain. In various embodiments, while only one insecure process and one secure process are illustrated, embodiments may generally include any quantity of insecure and secure process. In various embodiments, these processes may be distinguished within the illustrated domains by identifiers, which may be referred to as process identifiers or process IDs.

As illustrated, the secure domain may include a secure kernel 150, the operation of which is described in more detail with respect to subsequent Figures. In general, the secure kernel may include one or more core components of an operating system executing within the secure domain. In various embodiments, other components of the operating system may execute within insecure domain 100. In various embodiments, the operating system of which the kernel is a component may be loaded via a secure boot process. This secure boot process may include loading the operating system from an operating system image after successfully verifying that image as being secure. For example, the operating system image may be digitally signed; verifying the operating system may include verifying the digital signature as authentic. Once the image is verified, the operating system may be booted from that image. In various embodiments, the operating system image may be stored in memory of the secure domain or retrieved from another location accessible to the secure domain.

In various embodiments, secure kernel 150 may be configured to enable secure communication 140 through various techniques, which are described in more detail below with respect to FIGS. 2-8.

Figure 2:
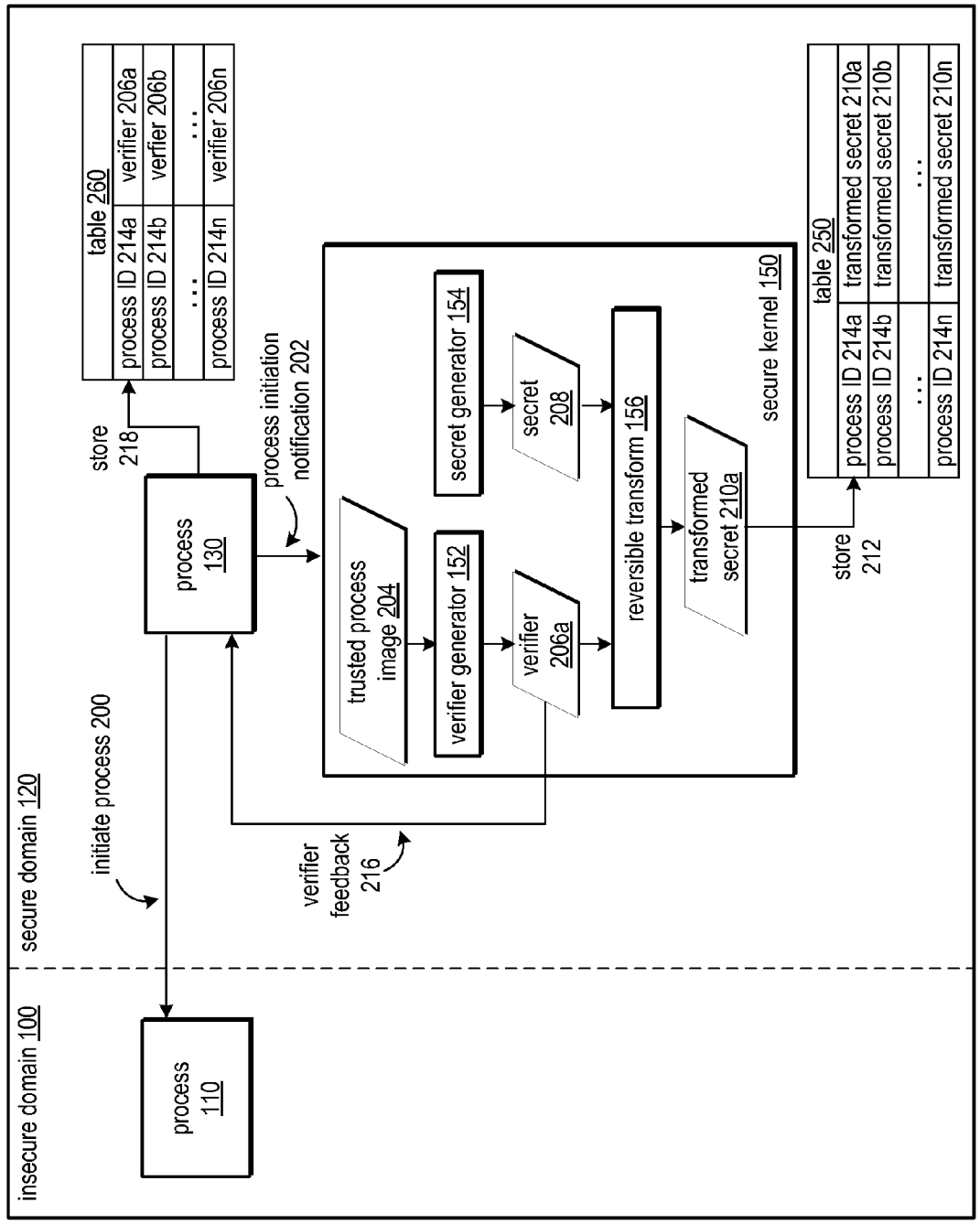
FIG. 2 illustrates a block diagram of an example system in which a transformed secret may be established for an insecure process, according to some embodiments.

FIG. 2 illustrates a flow diagram of the generation of a transformed secret that may be utilized for secure communication between process 110 and process 130, according to some embodiments. In the illustrated embodiment, process 130 may initiate process 110. For instance, process 110 may be a child process created (e.g., spawned or forked) by process 130. In other cases, the secure kernel may directly generate process 110. At 202, process 130 may provide a process initiation notification 202 to secure kernel 150. This notification may indicate that a particular process has been initiated and may specify the process ID of the process. Secure kernel 150 may locate a trusted process image 204 that is a trusted simulation of process 110 when loaded in memory at runtime. For instance, in one embodiment, one or more trusted process images may be stored in the secure domain, and secure kernel 150 may locate the correct image based on the process ID specified in notification 202. In various embodiments, the trusted image may be generated by secure kernel 150 itself. In various embodiments, the secure kernel may rely on the trusted process image as being a representation of the process that has not been altered. For instance, in some embodiments, it may be certain that process image 204 has not been altered by a malicious element (e.g., virus, malware, or some other unscrupulous component).

As described in more detail below, inclusion of certain information within the trusted process image may strengthen overall security, according to various embodiments. For instance, the image may also include values of certain registers (e.g., debugging registers). As described in more detail with respect to FIG. 3, if these values change during runtime (e.g., if an attacker is trying to inspect the code with a debugger thus causing the register values to change), then the secure kernel create an incorrect de-transformed secret, which may prevent secure communication between the insecure process and the secure process.

Secure kernel 150 may include a verifier generator 152 configured to generate a verifier from the trusted process image. In various embodiments, verifier generator 152 may be configured to perform a cryptographic hash function on the trusted process image to generate a hash. For instance, verifier generator 152 may perform a hash function that inputs trusted process image 204 as a message and outputs verifier 206a as a message digest. In general, verifier generator 152 may perform an irreversible transform on the trusted process image 204 in order to generate verifier 206a. In various embodiments, each verifier generated by verifier generator 152 may have a fixed width data size (e.g., 128 bits).

Secure kernel 150 may also include a secret generator 154 configured to generate a secret 208; secret 208 may also be referred to herein as an untransformed secret. In various embodiments, the secure kernel may include a reversible transform component 156 configured to transform untransformed secret 208 with verifier 206a in order to generate transformed secret 210a. In various embodiments, the reversible transform may be a bitwise transform, such as a bitwise exclusive-or ("XOR") operation. In cases where reversible transform 156 performs a bitwise operation, verifier 206a, secret 208, and transformed secret 210a may have the same data size (e.g., each may be 128 bits in length). At 212, the transformed secret 210a is stored within memory in table 250. Within the table, transformed secret 210a may be associated (or "keyed") to the process ID 214a, which identifies the insecure process for which the transformed secret was generated (e.g., process 110). As illustrated by process IDs 214b-214n and transformed secrets 210b-210n, multiple other transformed secrets may be generated for other insecure process according to similar techniques. As described in more detail below, a given transformed secret may enable secure communication between a process in the insecure domain and a process in the secure domain. As illustrated at 216, verifier 206a may be returned to process 130, which at 218 may store the verifier in table 260. Table 260 may associate process IDs (e.g., process IDs 214a-n) with associated verifiers generated by the secure kernel (e.g., verifiers 206a-n). As described in more detail below with respect to FIG. 5, this table may be utilized by a secure process to retrieve the correct verifier when submitting requests to secure kernel 150.

Figure 3:
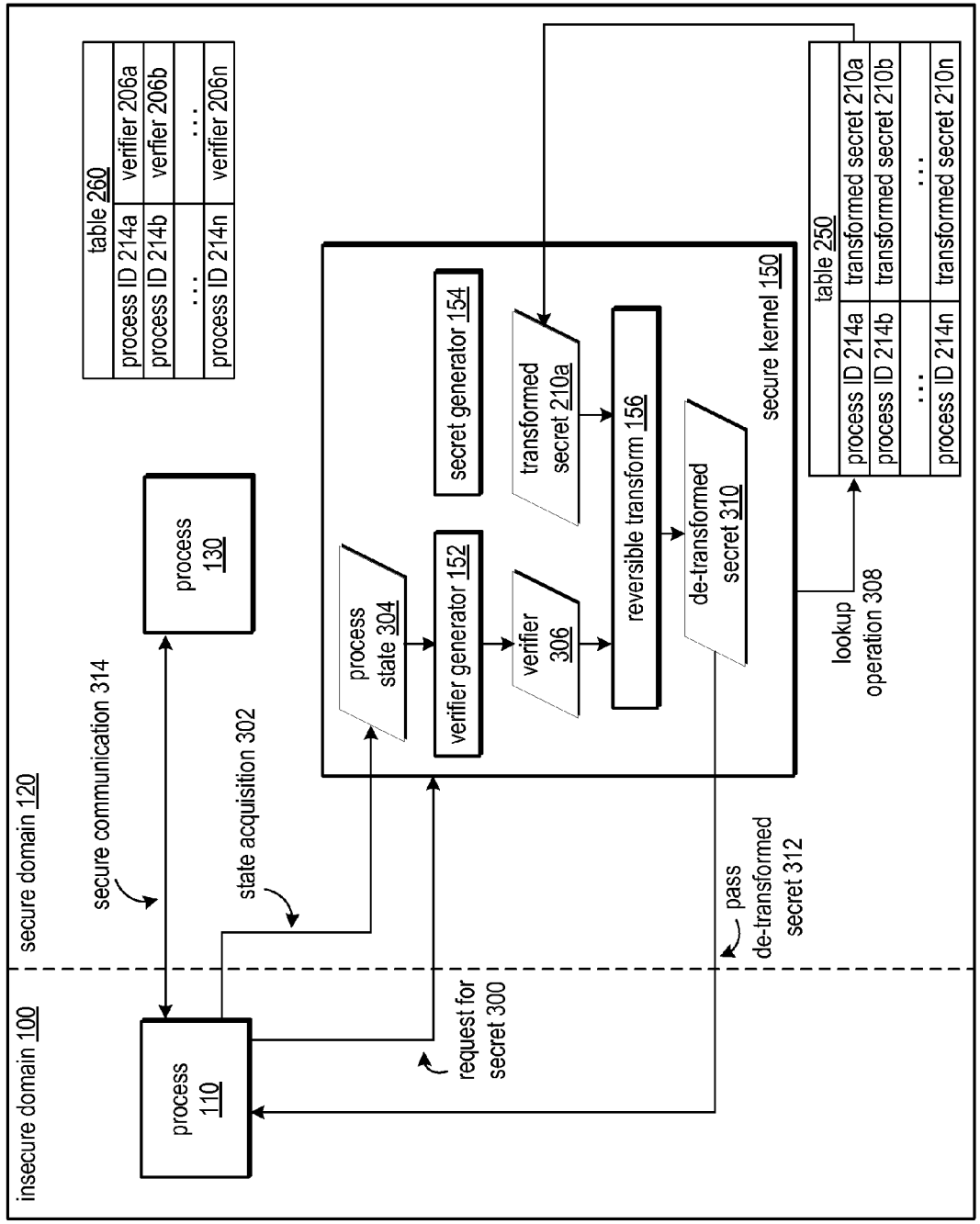
FIG. 3 illustrates a block diagram of an example system in which an insecure process may request a secret for use in secure communications, according to some embodiments.

FIG. 3 illustrates a flow diagram in which the transformed secret associated with the insecure process may be used for secure communication between the insecure process and the secure process. Note that in FIG. 3, the state of the configuration may some point after the operations of FIG. 2 are performed (e.g., a transformed secret for process 110 has already been generated and stored in table 250). In the illustrated embodiment, process 110 may submit a request for a de-transformed version of the transformed secret previously generated and stored in table 100. As described in more detail below, such de-transformed secret may be used to provide secure communication (e.g., that secret may be used as a cryptographic key for encryption/decryption or may be used to generate such a key).

As illustrated at 302, in response to the request, secure kernel 150 may capture the current state of process 110 while that process resides in the insecure domain. The captured state is illustrated as process state 304 in the illustrated embodiment. In various embodiments, as long as process 110 has not been altered (e.g., by a virus or malware), the current process state 304 should be the same as trusted process image 204. In various embodiments, the format or structure of process state 304 may be the same as the original trusted image 204. For instance, as described above, the trusted image may also include values of certain registers (e.g., debugging registers). If these values change during runtime in the insecure domain (e.g., if an attacker is trying to inspect the code with a debugger thus causing the register values to change), then process state 304 will not be the same as trusted process image 204. As described below, this may cause the secure kernel to create an incorrect de-transformed secret, which may prevent secure communication between the insecure process and the secure process.

As illustrated, verifier generator 152 may generate a second verifier 306 for the insecure process based on the acquired process state 304. In various embodiments, the verifier generator 152 may generate this verifier according to the same technique used to generate verifier 206a. For instance, if verifier 206a were generated as the digest of a cryptographic hash function applied to trusted process image 204, verifier 306 may be generated as the digest of the same cryptographic hash function applied to process state 304.

As illustrated at 308, secure kernel 150 may use the process ID 210a of the insecure process to locate the previously generated transformed secret 210a from table 250. Reversible transform 156 may reverse transform transformed secret 210a with verifier 306. As should be apparent from the configuration of FIGS. 2 and 3, if verifier 306 is the same as verifier 206a (i.e., if the process has not been altered, maliciously or otherwise), the de-transformed secret 310 will be equivalent to secret 208. If verifier 306 is not the same as verifier 206a (i.e., if the process has been altered, maliciously or otherwise), the de-transformed secret 310 will not be equivalent to secret 208.

In the illustrated embodiment, the secure kernel may provide the de-transformed secret 312 to process 110. Process 110 may use the de-transformed secret to decrypt information received from process 130 and/or to encrypt information sent to process 130. To perform such decryption/encryption, process 110 may utilize de-transformed secret 312 as a cryptographic key (e.g., a symmetric key). In other cases, process 110 may generate a cryptographic key based on the transformed secret. For instance, process 110 may apply a key derivation function to de-transformed secret 312 and use the result as a cryptographic key.

Secure communication 314 may represent the transfer of information from process 110 to process 130 and/or the transfer of information from process 130 to process 110. For information sent to process 130 during secure communication 314, process 110 may first encrypt the information using the cryptographic key (based on de-transformed secret 312). As describe in more detail below, process 130 may be able to decrypt this information because process 130 may have access to an equivalent key. For information received from process 130 during secure communication 314, process 110 may decrypt this information using the cryptographic key (based on de-transformed secret 312). In various embodiments, this may be the correct key because process 130 may have encrypted the information with an equivalent key, as described in more detail with respect to FIG. 5.

Figure 4:
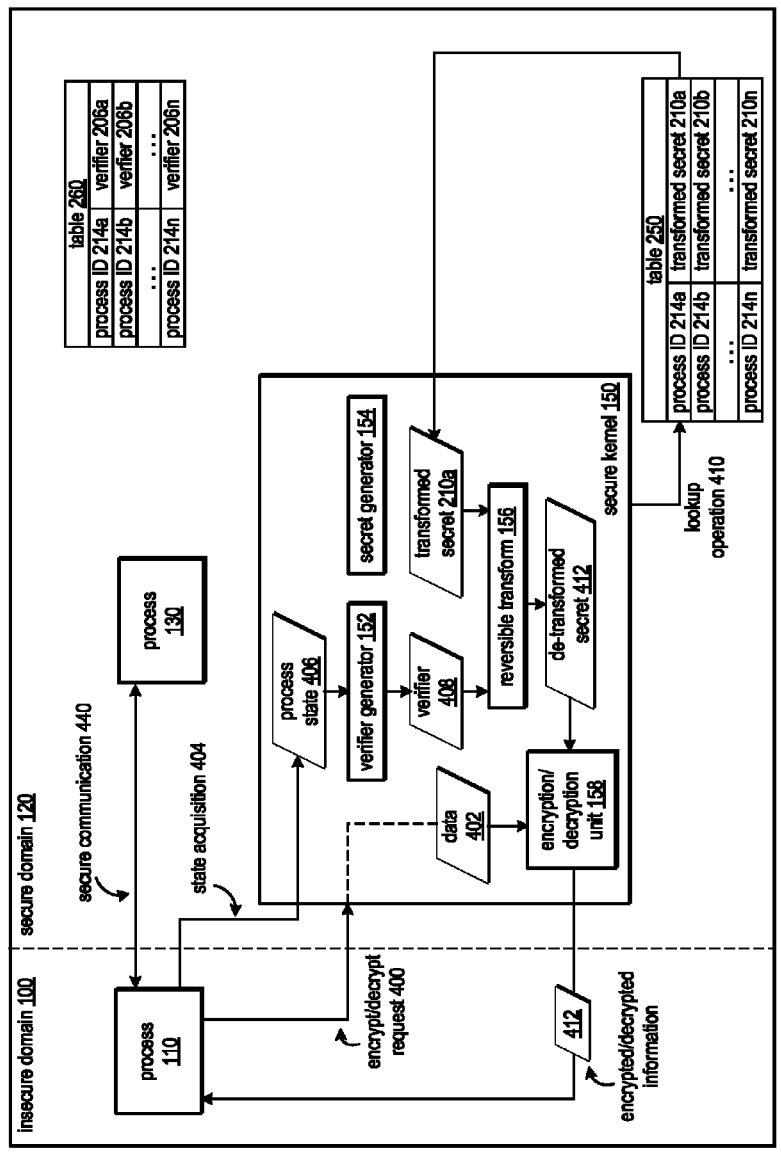
FIG. 4 illustrates a block diagram of an example system in which an insecure process requests a secure kernel to encrypt or decrypt information, according to some embodiments.

FIG. 4 illustrates a flow diagram of another example in which the transformed secret associated with the insecure process may be used for secure communication between the insecure process and the secure process. Note that in FIG. 3, the state of the configuration may some point after the operations of FIG. 2 are performed (e.g., a transformed secret for process 110 has already been generated and stored in table 250). As described in more detail below, instead of process 110 performing the actual encryption or decryption of information, the secure kernel of the illustrated embodiment may perform such functions. In various embodiments, this may circumvent the need to expose the de-transformed secret outside of the secure domain.

As illustrated at 400, process 110 may provide an encryption or decryption request 400 to secure kernel 150. For instance, process 110 may have received information (e.g., during secure communication 440) from process 130 that resides in an encrypted form; process 110 may submit such information as part of the request in order to have such information decrypted and returned. In another example, prior to process 110 sending information to process 130, process 110 may submit such information to be encrypted by the secure kernel. An encryption and decryption unit 158 may extract such information, which is illustrated as data 402, and perform encryption or decryption as specified by request 400. The key with which data 402 is encrypted or decrypted may be generated by encryption/decryption unit 158 based on de-transformed secret 412, which is described in more detail below.

As illustrated at 404, in response to request 400, secure kernel 150 may capture the current state of process 110 while that process resides in the insecure domain. The captured state is illustrated as process state 406 in the illustrated embodiment. In various embodiments, as long as process 110 has not been altered (e.g., by a virus or malware), the current process state 406 should be the same as trusted process image 204. In various embodiments, the format or structure of process state 406 may be the same as the original trusted image 204. For instance, as described above, the trusted image may also include values of certain registers (e.g., debugging registers). If these values change during runtime in the insecure domain (e.g., if an attacker is trying to inspect the code with a debugger thus causing the register values to change), then process state 406 will not be the same as trusted process image 204. As described below, this may cause the secure kernel to create an incorrect de-transformed secret, which may prevent secure communication between the insecure process and the secure process.

As illustrated, verifier generator 152 may generate a second verifier 408 for the insecure process based on the acquired process state 406. In various embodiments, the verifier generator 152 may generate this verifier according to the same technique used to generate verifier 206a. For instance, if verifier 206a were generated as the digest of a cryptographic hash function applied to trusted process image 204, verifier 408 may be generated as the digest of the same cryptographic hash function applied to process state 406.

As illustrated at 410, secure kernel 150 may use the process ID 210a of the insecure process to locate the previously generated transformed secret 210a from table 250. Reversible transform 156 may reverse transform transformed secret 210a with verifier 408. As should be apparent from the configuration of FIGS. 2 and 4, if verifier 408 is the same as verifier 206a (i.e., if the process has not been altered, maliciously or otherwise), the de-transformed secret 412 will be equivalent to secret 208. If verifier 408 is not the same as verifier 206a (i.e., if the process has been altered, maliciously or otherwise), the de-transformed secret 310 will not be equivalent to secret 208.

In the illustrated embodiment, encryption/decryption unit 158 may be configured to encrypt or decrypt data 402 with de-transformed secret 412 to generate encrypted or decrypted information 414, respectively. In other cases, encryption/decryption unit may generate a cryptographic key from the de-transformed secret 412 (e.g., with a key derivation function) and use that key to encrypt or decrypt data 402 to generate encrypted or decrypted information 414. Once encrypted or decrypted (depending upon what operation was requested), information 414 may be provided to process 110. If the information were decrypted, process 110 may now decipher a clear version of the information. If the information were encrypted, process 110 may communicate the encrypted information to process 130.

Figure 5:
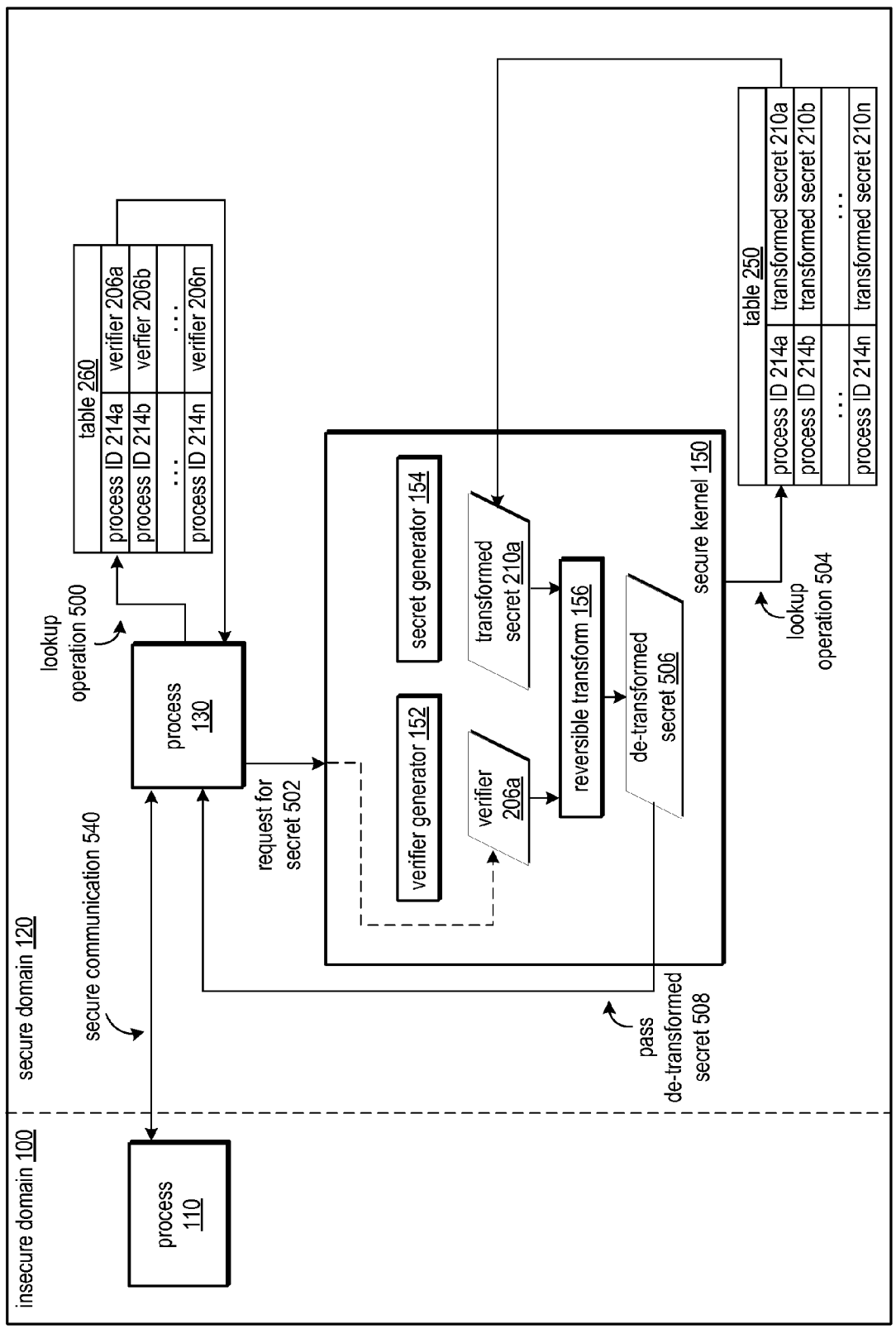
FIG. 5 illustrates a block diagram of an example system in which a secure process uses a previously-established secret to securely communicate with an insecure process that is outside of a secure domain, according to some embodiments.

FIG. 5 illustrates a flow diagram of the secure process acquiring a de-transformed secret corresponding to an insecure process and using that secret to security communicate with the insecure process. During secure communication 540, process 130 may receive encrypted information from process 110 and/or process 130 may send encryption information to process 110. In either case, process 130 may acquire a de-transformed secret from the secure kernel and use such secret for encrypting outgoing information or decrypting incoming information.

As illustrated at 500, prior to generating a request for the secret, process 130 may perform a lookup operation in table 260 in order to determine the verifier 206*a* that corresponds to process 110 (e.g., as specified by process ID). Process 130 may generate a request for secret at 502; this request may include verifier 206*a* retrieved from table 260 (note verifier 206*a* was generated for process 110 as described above). Secure kernel 150 may receive the request and process the request differently than the requests of FIG. 3 and FIG. 4 by virtue of the request originating from secure process 130. In some cases, secure kernel 150 may provide an application programming interface (API) accessible to secure process and not accessible to processes outside of the secure domain. Request 502 may be provided through such API.

As illustrated, secure kernel 150 may extract verifier 206*a* from the request. The secure kernel may also perform a lookup operation 504 to determine the transformed secret previously generated for process 110. For instance, the secure kernel may extract the process ID of the insecure process from request 502 and use that process ID to find the associated transformed secret in table 250. In various embodiments, secure kernel 150 may use reversible transform 156 to reverse transform transformed secret 210*a* with verifier 206*a* to generate de-transformed secret 506. The secure-kernel may prove de-transformed secret 508 to process 130.

As described above, process 130 may have received an encrypted communication from process 110 and/or may be tasked with sending encrypted information to process 110. In either case, process 130 may generate a cryptographic key from de-transformed secret 506 (or may use the de-transformed secret itself as a key) and use such key for decrypting information received from process 110 and/or encrypting information sent to process 110.

In various embodiments, secure communication may be facilitated due to information being sent from process 110 to process 130 (and vice versa) protected (e.g., encrypted) with the same cryptographic key. For instance, the techniques described herein may ensure that both process 110 and process 130 are utilizing equivalent keys as long as process 110 has not been modified relative to the original trusted image of process 110. For instance, in one example, de-transformed secret 508 and de-transformed secret 310 (or 410) may be the same in accordance with the description herein provided process 110 has not been modified. For instance, as described above, if the insecure process has been modified (e.g., by malware or otherwise), this will "trickle down" to the de-transformed secret created for the insecure process. As should be apparent from FIGS. 3 and 4, for example, modifying process 110 would cause the captured state of that process to be incorrect, which would also cause the generated verifier to be incorrect. If that verifier is incorrect, the de-transformed secret (and any cryptographic keys generated therefrom) will also be incorrect. As such, the techniques described herein may ensure that an insecure process in an insecure domain and a secure process in a secure domain may communicate securely (e.g., through the encryption described herein) without embedding (e.g., hard-coding) a cryptographic key within process 110. By not embedding a key in process 110, embodiments may prevent an inspection of the executable instructions and data implementing process 110 (or some other attack) from yielding knowledge of the key.

Figure 6:
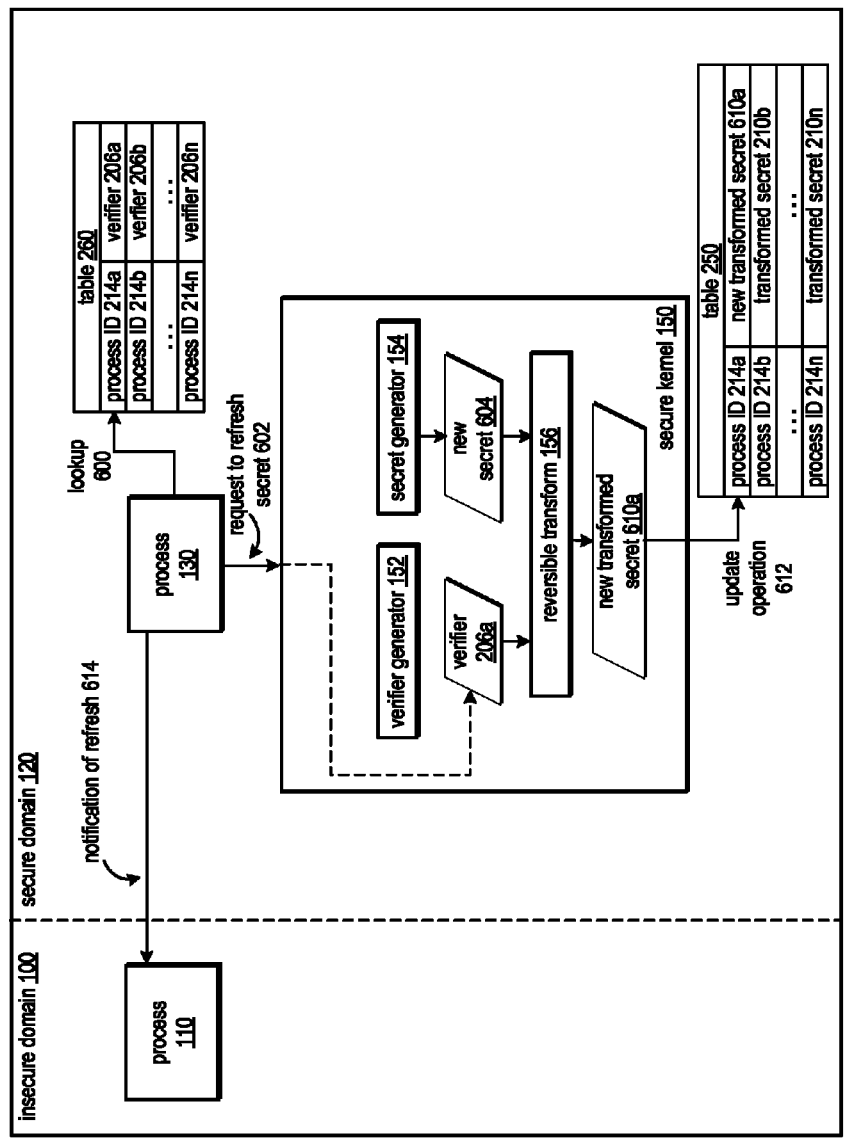
FIG. 6 illustrates a block diagram of an example system in which stored secrets may be refreshed, according to some embodiments.

In various embodiments, the transformed secret associated with the secure process may be updated over time (e.g., similar to a key rollover operation). FIG. 6 illustrates a flow diagram of an example embodiment for refreshing the transformed secret associated with an insecure process. As illustrated at 602, process 130 may initiate the refresh of the secret by sending a request to refresh the secret to secure kernel 150. This request may include the process ID of process 110 as well as the verifier (e.g., verifier 206*a*) of that process as determined by lookup operation 600. Secure kernel 150 may generate a new secret 604 (different than secret 208) and then transform that new secret with verifier 206*a* to generate new transformed secret 610*a*. In various embodiments, this transformation may be performed with the reversible transform previously utilized (e.g., reversible transform 156). In other cases, the transformation may be performed with a different transform provided that transform is a also a reversible transform. In some embodiments, a different reversible transform may be utilized each time the secret is refreshed. At 612, secure kernel 150 may perform an update operation to store the new transformed secret within table 250 thereby replacing the old secret. As illustrated at 614, process 130 may notify process 110 of the key refresh. For instance, the notification may specify that the secret is going to change soon or that the secret is scheduled to change at a specific time.

Figure 7:
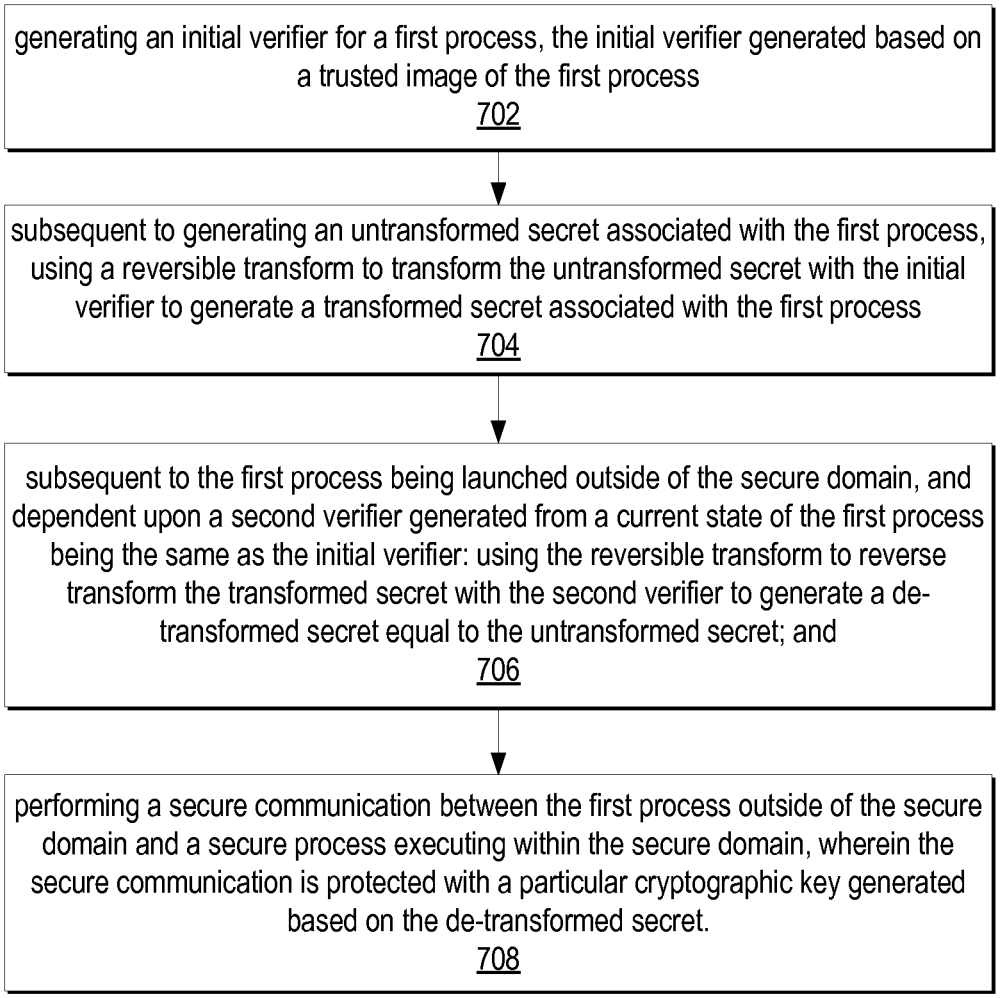
FIG. 7 illustrates a flow chart of an example method for establishing and using a secret, according to some embodiments.
Figure 8:
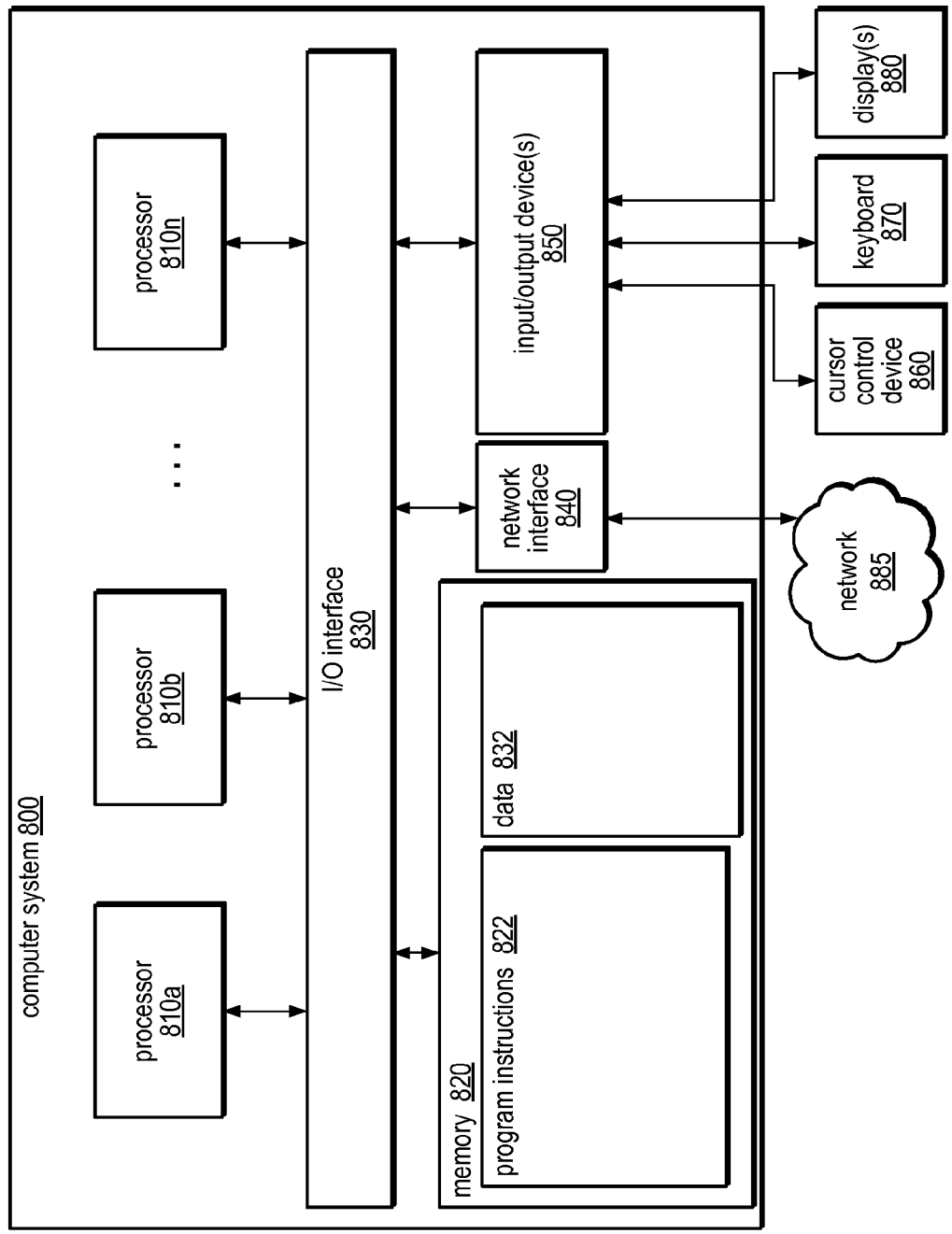
FIG. 8 illustrates an example computer system suitable for implementing various components of the system and method for establishing a shared secret for communication between different security domains, according to various embodiments.

Embodiments may also include methods for implementing the techniques described herein, an example of which is illustrated in FIG. 7. In various embodiments, the method of FIG. 7 may be implemented on a computer system, such as computer system 800 described below. In various embodiments, one or more portions of the method may be performed within a secure domain (e.g., secure domain 120) that provides a level of security greater than one or more or more other domains (e.g., insecure domain 100).

The method may begin at 702, which may include generating an initial verifier for a first process, wherein the initial verifier is generated based on a trusted image of the first process. For instance, this portion of the method may include utilizing the techniques described above with respect to generating 206*a* of FIG. 2 (e.g., generating a hash of the trusted image). At 702, the method may include subsequent to generating an untransformed secret (e.g., secret 208 of FIG. 2) associated with the first process, using a reversible transform (e.g., reversible transform 156) to transform the untransformed secret with the initial verifier to generate a transformed secret (e.g., transformed secret 210*a*) associated with the first process. At 706, the method may include subsequent to the first process being launched outside of the secure domain (e.g., initiate process 200 of FIG. 2), and dependent upon a second verifier generated from a current state of the first process being the same as the initial verifier (e.g., process state 304 or 406 of previous Figures), using the reversible transform (e.g., reversible transform 156) to reverse transform the transformed secret with the second verifier to generate a de-transformed secret equal to the untransformed secret (e.g., creating de-transformed secret 310 or 412 described above). At 708, the method may also include performing a secure communication between the first process outside of the secure domain and a secure process executing within the secure domain (e.g., secure communication 324 or 440). The secure communication may be protected with a particular cryptographic key generated (e.g., with a KDF) based on the de-transformed secret (e.g., de-transformed secret 310 or 412 described above). In various embodiments, various addition or modifications may be performed on the method described above. It should be understood that the illustrated method is only one example within the spirit and scope of various embodiments. In general, the methods may include performing any functionality or operation described herein.

Example Computer System

Various embodiments of a system and method for establishing a shared secret for communication between different security domains, as described herein, may be executed on one or more computer systems, which may interact with various other devices. One such computer system is computer system 800 illustrated by FIG. 8, which may in various embodiments implement any of the systems, devices, elements or methods illustrated in FIGS. 1-7. For instance, any of the functionality described above may be stored in memory as processor-executable executable program instructions 822 (e.g., program instructions executable by processor(s) 810). In one non-limiting example, computer system 800 may be configured to implement one or more domains, such as a secure domain and an insecure domain (e.g., domains 100 and 120 described above). In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, program instructions 822 may be executable by the processor(s) to implement the functionality of any component or element described above, such as process 110, process 130, and/or secure kernel 150. As illustrated, in various embodiments, data 832 may store any data or information described herein, such as tables 250 and 260 described above. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the computer system, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 885), or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the process or methods described above, such as those of FIGS. 1-7. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
    generating an initial verifier for a first process based on a trusted image of the first process obtained from within a secure domain;
    using a reversible transform to transform a secret associated with the first process with the initial verifier to generate a transformed secret associated with the first process;
    capturing a current state of the first process while the first process resides outside of the secure domain, the current state of the first process corresponding to one or more of a format or a structure of the first process;
    subsequent to the first process being launched outside of the secure domain, and dependent upon a second verifier generated from the current state of the first process captured outside of the secure domain being the same as the initial verifier: using the reversible transform to reverse transform the transformed secret with the second verifier to generate a de-transformed secret that is equivalent to the secret associated with the first process; and
    performing a secure communication between the first process outside of the secure domain and a second process executing within the secure domain, wherein the secure communication is protected with a particular cryptographic key generated based on the de-transformed secret.

2. The computer-implemented method of claim 1, wherein the generation of the initial verifier, the secret associated with the first process, the transformed secret, and the de-transformed secret are performed by a secure kernel of an operating system within the secure domain.

3. The computer-implemented method of claim 1, wherein the method comprises:
    the first process receiving the de-transformed secret;
    the first process generating the cryptographic key based on the de-transformed secret; and
    the first process performing one or more of:
        using the cryptographic key to encrypt information to be sent to the second process; or
        using the cryptographic key to decrypt information received from the second process.

4. The computer-implemented method of claim 1, wherein the method comprises:
    receiving from the first process a request to encrypt or decrypt information within the secure domain, the request originating from outside the secure domain;
    using the cryptographic key to encrypt or decrypt that information in accordance with the request from the first process; and
    providing the encrypted or decrypted information from the secure domain to the first process executing outside of the secure domain.

5. The computer-implemented method of claim 4, wherein the information provided to the first process is encrypted, wherein performing said secure communication comprises the first process providing that encrypted information to the second process within the secure domain.

6. The computer-implemented method of claim 1, wherein the method comprises:
    receiving from the second process, a request for the secret associated with the first process;
    responsive to the second process executing within the secure domain:
        performing a reverse transform on the transformed secret to generate a second de-transformed secret equivalent to the secret associated with the first process, and
        providing the second de-transformed secret to the second process in response to the request.

7. The computer-implemented method of claim 6, wherein the method comprises:
    the second process generating another cryptographic key from the second de-transformed secret; and
    the second process using the other cryptographic key to perform one or more of:
    encrypting information to be sent to the first process, or
    decrypting information received from the first process.

8. The computer-implemented method of claim 1, wherein the trusted image of the first process comprises a verified in-memory representation of the first process.

9. The computer-implemented method of claim 1, wherein the method comprises generating the initial verifier and the second verifier with a cryptographic hash function.

10. The computer-implemented method of claim 1, wherein the method comprises:
    receiving from the second process, a request to refresh the secret associated with the first process;
    responsive to the request, generating a new secret associated with the first process; and
    transforming the new secret with the initial verifier to generate a new transformed secret associated with the first process.

11. The computer-implemented method of claim 10, wherein said transforming the new secret is performed with said reversible transform or a different reversible transform.

12. A system, comprising:
a memory; and
one or more processors coupled to the memory, wherein the memory stores program instructions executable by the one or more processors to perform operations including:
   generating an initial verifier for a first process based on a trusted image of the first process obtained from within a secure domain;
   using a reversible transform to transform a secret associated with the first process with the initial verifier to generate a transformed secret associated with the first process;
   capturing a current state of the first process while the first process resides outside of the secure domain, the current state of the first process corresponding to one or more of a format or a structure of the first process;
   subsequent to the first process being launched outside of the secure domain, and dependent upon a second verifier generated from the current state of the first process captured outside of the secure domain being the same as the initial verifier: using the reversible transform to reverse transform the transformed secret with the second verifier to generate a de-transformed secret that is equivalent to the secret associated with the first process; and
   performing a secure communication between the first process outside of the secure domain and a second process executing within the secure domain, wherein the secure communication is protected with a particular cryptographic key generated based on the de-transformed secret.

13. The system of claim 12, wherein the program instructions are executable by the one or more processors to implement a secure kernel of an operation system within the secure domain to perform the generation of the initial verifier, the secret associated with the first process, the transformed secret, and the de-transformed secret.

14. The system of claim 12, wherein the program instructions are executable by the one or more processors to cause the first process to:
   receive the de-transformed secret;
   generate the cryptographic key based on the de-transformed secret; and
   perform one or more of:
      using the cryptographic key to encrypt information to be sent to the second process; or
      using the cryptographic key to decrypt information received from the second process.

15. The system of claim 12, wherein the program instructions are executable by the one or more processors to:
   receive from the first process a request to encrypt or decrypt information within the secure domain, the request originating from outside the secure domain;
   use the cryptographic key to encrypt or decrypt that information in accordance with the request from the first process; and
   provide the encrypted or decrypted information from the secure domain to the first process executing outside of the secure domain.

16. The system of claim 15, wherein the information provided to the first process is encrypted, wherein to perform said secure communication the program instructions are executable by the one or more processors to cause the first process to provide that encrypted information to the secure process within the secure domain.

17. The system of claim 12, wherein the program instructions are executable by the one or more processors to:
   receive from the second process, a request for the secret associated with the first process;
   responsive to the secure process executing within the secure domain:
      perform a reverse transform on the transformed secret to generate a second de-transformed secret equivalent to the secret associated with the first process, and
      provide the second de-transformed secret to the second process in response to the request.

18. The system of claim 17, wherein the program instructions are executable by the one or more processors to cause the second process to:
   generate another cryptographic key from the second de-transformed secret;
   use the other cryptographic key to perform one or more of:
      encrypting information to be sent to the first process, or
      decrypting information received from the first process.

19. The system of claim 12, wherein the trusted image of the first process comprises a verified in-memory representation of the first process.

20. The system of claim 12, wherein the program instructions are executable by the one or more processors to generate the initial verifier and the second verifier with a cryptographic hash function.

21. The system of claim 12, wherein the program instructions are executable by the one or more processors to:
   receive from the second process, a request to refresh the secret associated with the first process;
   responsive to that request, generate a new secret associated with the first process; and
   transform the new secret with the initial verifier to generate a new transformed secret associated with the first process.

22. The system of claim 21, wherein the program instructions are executable by the one or more processors to perform the transformation of the new secret with said reversible transform or a different reversible transform.

23. A computer-readable storage device storing computer-executable instructions that are executable by a computing device to cause the computing device to perform operations comprising:
   generating an initial verifier for a first process based on a trusted image of the first process obtained from within a secure domain;
   using a reversible transform to transform a secret associated with the first process with the initial verifier to generate a transformed secret associated with the first process;
   capturing a current state of the first process while the first process resides outside of the secure domain, the current state of the first process corresponding to one or more of a format or a structure of the first process;
   subsequent to the first process being launched outside of the secure domain, and dependent upon a second verifier generated from the current state of the first process captured outside of the secure domain being the same as the initial verifier: using the reversible transform to reverse transform the transformed secret with the second verifier to generate a de-transformed secret that is equivalent to the secret associated with the first process; and
   performing a secure communication between the first process outside of the secure domain and a second process executing within the secure domain, wherein the secure communication is protected with a particular cryptographic key generated based on the de-transformed secret.

24. The computer-readable storage device of claim 23, wherein the operations comprise implementing a secure kernel of an operation system within the secure domain to perform the generation of the initial verifier, the secret associated with the first process, the transformed secret, and the de-transformed secret.

25. The computer-readable storage device of claim 23, wherein the operations comprise:
receiving the de-transformed secret;
generating the cryptographic key based on the de-transformed secret; and
performing one or more of:
using the cryptographic key to encrypt information to be sent to the second process; or
using the cryptographic key to decrypt information received from the second process.

26. The computer-readable storage device of claim 23, wherein the operations comprise receiving from the first process a request to encrypt or decrypt information within the secure domain, the request originating from outside the secure domain;
using the cryptographic key to encrypt or decrypt that information in accordance with the request from the first process; and
providing the encrypted or decrypted information from the secure domain to the first process executing outside of the secure domain.

27. The computer-readable storage device of claim 26, wherein the information provided to the first process is encrypted, and wherein performing said secure communication comprises causing the first process to provide that encrypted information to the second process within the secure domain.

28. The computer-readable storage device of claim 23, wherein the operations comprise:
receiving from the second process, a request for the secret associated with the first process;
responsive to the second process executing within the secure domain:
performing a reverse transform on the transformed secret to generate a second de-transformed secret equivalent to the secret associated with the first process, and
providing the second de-transformed secret to the second process in response to the request.

29. The computer-readable storage device of claim 28, wherein the operations comprise:
generating another cryptographic key from the second de-transformed secret;
using the other cryptographic key to perform one or more of:
encrypting information to be sent to the first process, or
decrypting information received from the first process.

30. The computer-readable storage device of claim 23, wherein the trusted image of the first process comprises a verified in-memory representation of the first process.

31. The computer-readable storage device of claim 23, wherein the operations comprise generating the initial verifier and the second verifier with a cryptographic hash function.

32. The computer-readable storage device of claim 23, wherein the operations comprise:
receiving from the second process, a request to refresh the secret associated with the first process;
responsive to that request, generating a new secret associated with the first process; and
transforming the new untransformed secret with the initial verifier to generate a new transformed secret associated with the first process.

33. The computer-readable storage device of claim 32, wherein the operations comprise performing the transformation of the new secret with said reversible transform or a different reversible transform.

* * * * *